United States Patent [19]

Wolde-Michael

[11] 4,375,411

[45] Mar. 1, 1983

[54] DEVICE FOR LIMITING VORTEX FLOW

[75] Inventor: Girma Wolde-Michael, Little Canada, Minn.

[73] Assignee: Donaldson Company, Inc., Minneapolis, Minn.

[21] Appl. No.: 254,739

[22] Filed: Apr. 16, 1981

[51] Int. Cl.³ .............................................. B01D 21/26
[52] U.S. Cl. .................................................. 210/512.1
[58] Field of Search ............... 210/787, 788, 197, 294, 210/319, 320, 512.1, 512.3; 209/211

[56] References Cited

U.S. PATENT DOCUMENTS

| | | | | |
|---|---|---|---|---|
| 453,105 | 5/1891 | Bretney | ............................... | 210/512 |
| 3,731,802 | 5/1973 | James | .................................. | 210/197 |
| 3,764,005 | 10/1973 | Zemanek | ........................... | 209/211 |
| 4,142,972 | 3/1979 | Nebeker et al. | ..................... | 210/787 |
| 4,168,232 | 9/1979 | Allen et al. | ......................... | 210/167 |
| 4,265,740 | 5/1981 | Luthi | ................................... | 209/211 |

*Primary Examiner*—Ivars C. Cintins
*Attorney, Agent, or Firm*—Merchant, Gould, Smith, Edell, Welter & Schmidt

[57] ABSTRACT

A device (90) for limiting the vortex flow of a fluid is disclosed. The device includes means (91) for securing the device to a fixed position in a forced vortex environment at a location near the origin of the vortex flow. Means (94–98) for redeveloping an interrupted vortex flow and allowing the passage of the vortex air core therethrough is also provided but is spaced apart from but connected to the securing means (91). Means (93) for interrupting the vortex flow near its origin includes a passageway defined by the securing means (91) and the means for redeveloping the vortex flow.

13 Claims, 13 Drawing Figures

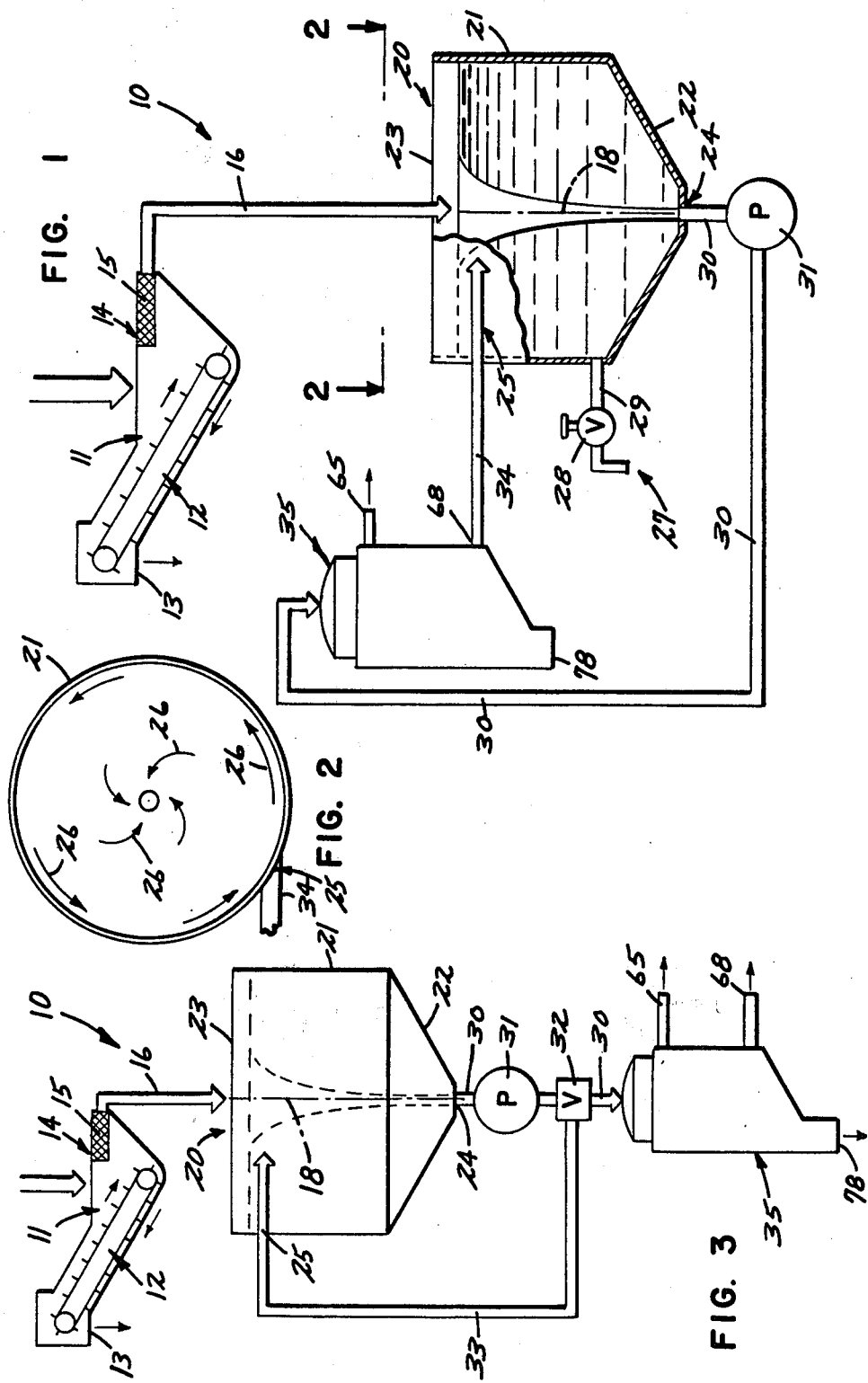

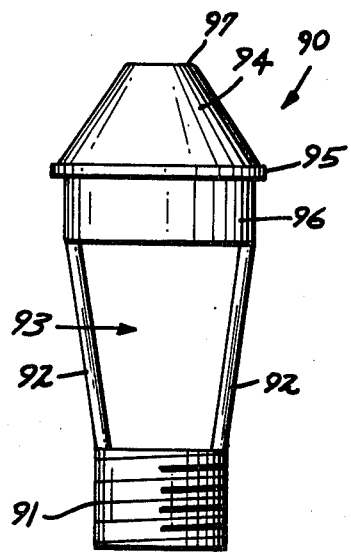
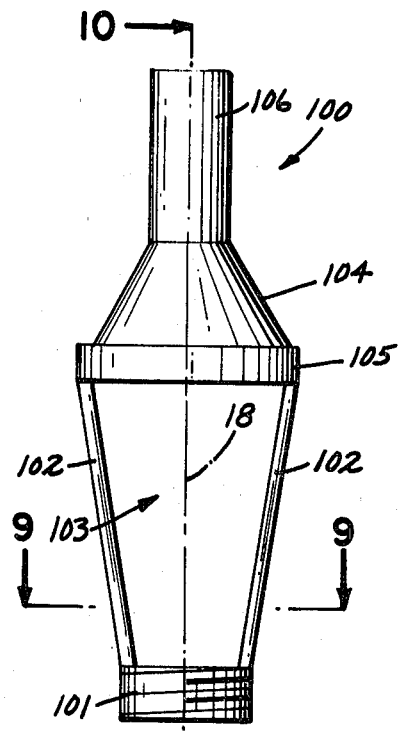
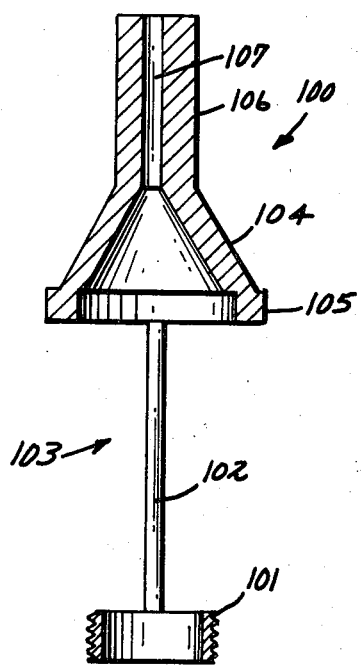
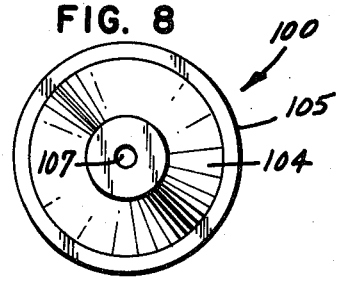
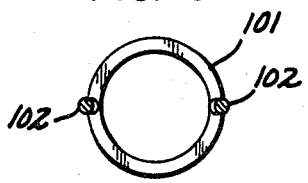

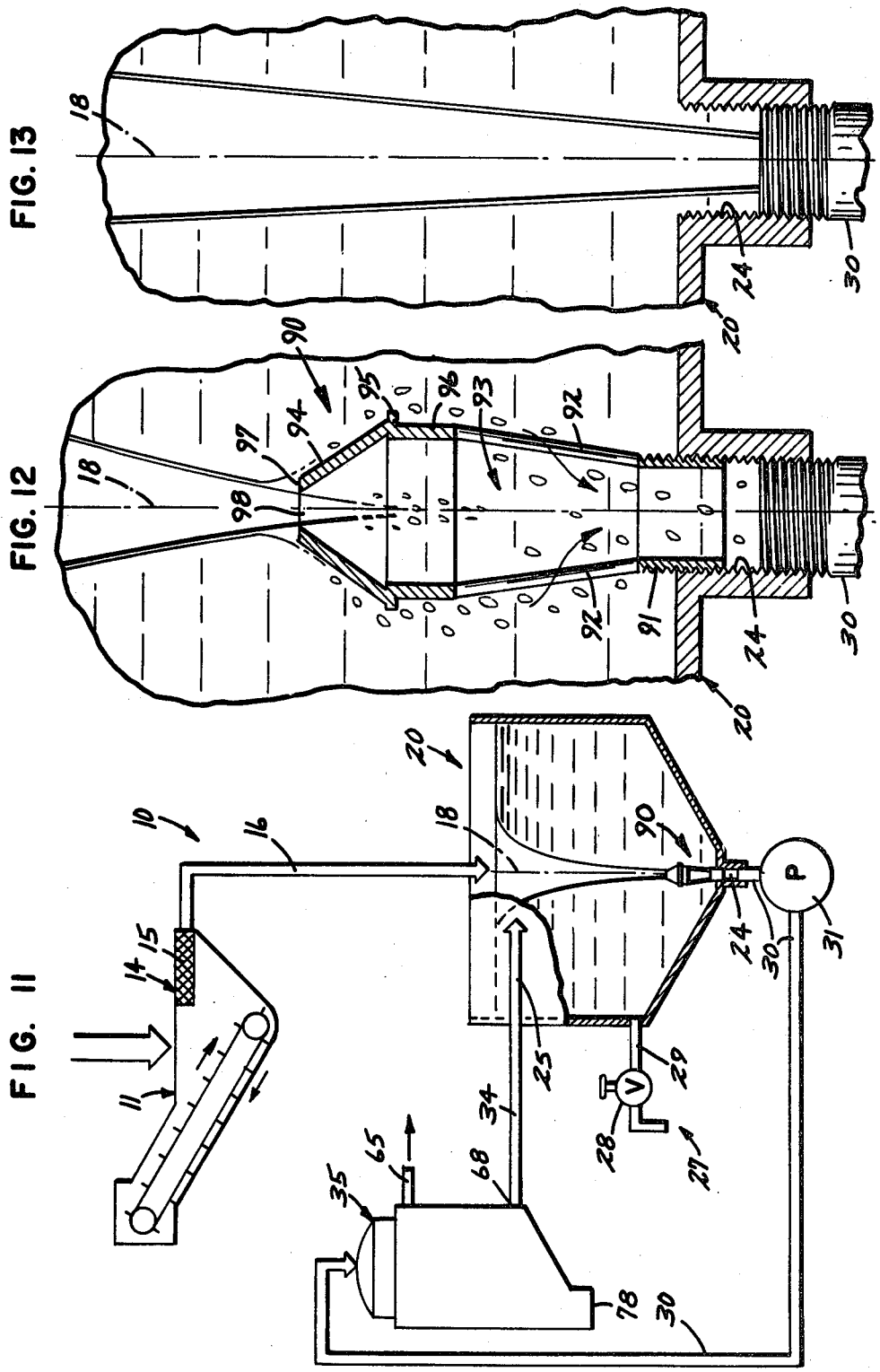

4,375,411

DEVICE FOR LIMITING VORTEX FLOW

TECHNICAL BACKGROUND

The present invention pertains to fluid recovery systems and in particular to a device which limits or interrupts the vortex flow of a fluid in the system recovering a coolant fluid from a contaminated mixture.

BACKGROUND

In industries such as the machine-tooling industry, one of the end results of the industrial process is a contaminated fluid mixture. The contaminated mixture typically includes a coolant fluid, generally water-based, lighter liquids such as free and mechanically emulsified oils, solids particulate and other impurities. The valuable component is the coolant fluid which acquires a build-up of free or tramp oil within it from leaks in the lubricating and hydraulic systems of the industry and further contamination from the oil-wetted parts being machined.

Due to stringent government regulations for the disposal of such contaminated mixtures as well as the desire by those in the industries for continued, indefinite use of the coolant fluid in more than one application, efforts have been spent in creating a system capable of recovering the valuable coolant fluid from the contaminated mixture. Not only must the metal solids, foreign objects and other impurities be removed from the mixture, but just as important is the removal of the free and mechanically emulsified oils which have accumulated in the coolant fluid during the machining processes. Also, the removal of oils must occur without resulting damage to the composition of the recovered coolant fluid.

Prior art recovery systems have addressed the problem of solids and impurities removal but their removal of free or tramp oils have generally been accomplished with various complex structural arrangements requiring substantial floor space for operation and they are often as expensive to maintain as they are to construct.

The present invention is one aspect of a much simplified recovery system design which achieves a high degree of recovered coolant clarity by methods unknown at present in the art. The present invention combined with the disclosed recovery systems substantially answers the pressing needs of modern industries for a recovery system which significantly increases the useful life of the coolant fluid while eliminating the disposal difficulties involved with the contaminated fluid mixtures.

SUMMARY OF THE INVENTION

The present invention is a device for limiting the vortex flow of a fluid within a forced vortex environment. The device is positioned at the origin of the vortex air core. Included in the device are means for securing the device to the structure of the forced vortex environment, a vortex generating member spaced apart from the securing means for allowing the redevelopment of an interrupted vortex flow and permitting the redeveloped air core to pass upwardly into the greater body of fluid, and means for interrupting the vortex flow near its origin. The interrupting means includes a passageway between the vortex generating member and the securing means as well as including supporting structure connecting the member to the securing means.

The present invention allows the air core of the fluid vortex flow to be interrupted so that a sufficient remixing of air, light liquid, i.e., oil, and heavy liquid, i.e., coolant fluid, occurs prior to transfer to a liquid/liquid/solid separator. In this manner, the "skimming" effect created in the forced vortex environment by the fluid vortex flow is not substantially affected, yet the detrimental disproportionate amounts of air and oil leaving the forced vortex environment and entering other elements of the system are avoided.

BRIEF DESCRIPTION OF THE DRAWINGS

FIG. 1 is a schematic, elevational view of one embodiment of a fluid recovery system with portions broken away and shown in cross-section.

FIG. 2 is a cross-sectional view of one aspect of the fluid recovery system as seen along lines 2—2 in FIG. 1.

FIG. 3 is a schematic, elevational view of a second embodiment of a fluid recovery system.

FIG. 6 is a side elevational view of the preferred embodiment of the present invention.

FIG. 7 is a side elevational view of a second embodiment of the present invention.

FIG. 8 is a top plan view of the present invention shown in FIG. 7.

FIG. 9 is a cross-sectional view of the present invention as seen along lines 9—9 in FIG. 7.

FIG. 10 is a cross-sectional view of the present invention as seen along lines 10—10 in FIG. 7.

FIG. 11 is a schematic, elevational view of the fluid recovery system seen in FIG. 1, now including the present invention.

FIG. 12 is a greatly-enlarged cross-sectional view of the present invention.

FIG. 13 is a greatly-enlarged cross-sectional view of one portion of the fluid recovery system without the present invention.

DETAILED DESCRIPTION OF THE PREFERRED EMBODIMENT

Figure 4:
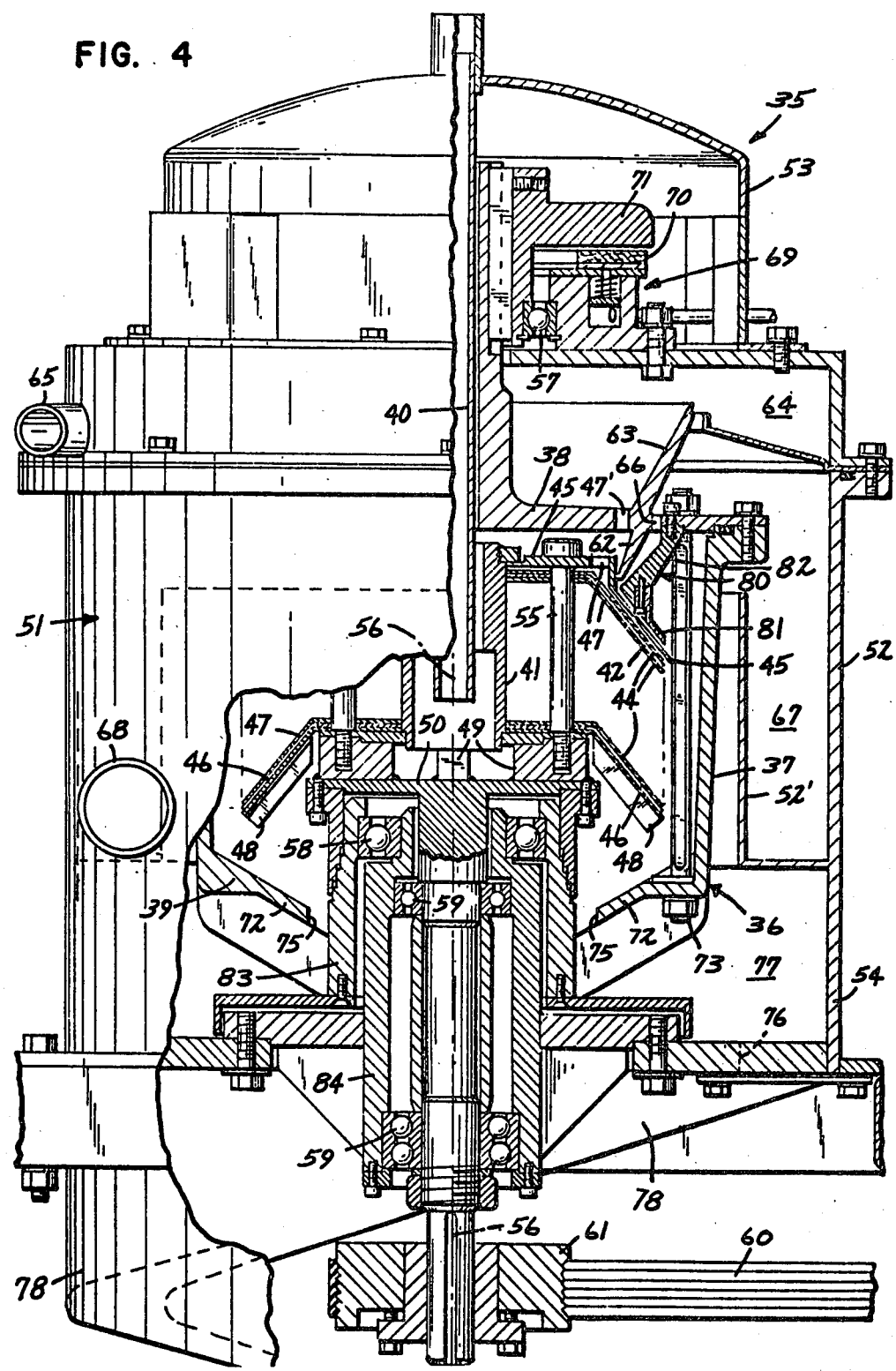
FIG. 4 is an elevational view of the liquid/liquid/solid separator with portions broken away and shown in cross-section.

In order to appreciate the present invention, the environment in which it is preferably used will be discussed in detail. The description of the preferred embodiment of the present invention will follow the description and operation of the preferred environment in which the invention is used. It should be understood, however, that the present invention and the use of it are not so strictly limited to the type of forced vortex environment disclosed herein.

Referring now to the drawings, wherein like reference numerals designate identical or corresponding parts throughout the several views, and more particularly to FIG. 1, a recovery system is indicated generally by the reference number 10. A solids dragout arrangement first receives the contaminated fluid mixture into the system 10. The dragout arrangement generally includes a holding tank 11, a standard dragout assembly 12 which removes the solids settling out from the fluid held in the tank 11, and a solids discharge opening 13 through which the "dragged-out" solids are removed from the tank 11. The contaminated fluid leaves the tank 11 by overflowing a portion 14 of the tank 11 through a grid-like screen 15 which prevents foreign objects floating on the surface of the mixture from overflowing the tank with the fluid mixture.

From the drag-out arrangement, the contaminated mixture flows into a recovery container 20 through or along a conduit 16 or other suitable transfer structure. The recovery container 20 in the preferred embodiment has a cylindrical shape with an open top 23 upon which a cover (not shown) can be placed. The bottom portion of the tank is typically frusto-conical in shape or a rounded dish shape so that the walls 22 of the container slope downwardly towards a central portion of the container's bottom wall. A circular outlet opening 24 is formed in the central portion of the container's bottom wall. The vertical axis 18 of the container 20 passes through the center of the outlet opening 24. Located along an upper portion of a side 21 of the container 20 is an inlet means 25, seen most clearly in FIG. 2, including a tube or pipe 34 positioned tangentially to the container so that fluid entering the container 20 through the pipe 34 is directed tangentially along the side wall 21 of the container 20. A standard fluid tap 27 is disposed in a lower portion of the container. The tap 27 includes a valve 28 and pipe 29, and allows the removal of clarified, recovered coolant fluid from the recovery container 20.

Secured to the container outlet opening 24 is a conduit 30, e.g. pipe or tubing, which receives fluid flow from the container outlet opening 24 and transfers the fluid to a remote location. Disposed in the conduit 30 is a pump 31. The preferred pump 31 is an air-operated diaphragm pump which is capable of transferring a fluid being carried upon the surface of a second fluid without substantial agitation of the fluids or causing a substantial remixing of the two fluids during the transfer. In a second embodiment of the system shown in FIG. 3, a standard two-way valve 32 is located upstream from the pump 31 in the conduit 30. The valve 32 is operable to return a portion of the container's discharged fluid to the container's inlet means 25 through a suitable conduit 33, e.g., pipe or tubing, while allowing a substantial portion of the fluid to pass through to the conduit 30. Alternately, all of the discharged fluid can be passed through the valve 32 into the conduit 30, thereby preventing any portion of the fluid from returning to the container 20.

In both embodiments, the conduit 30 transfers the container's discharged fluids with the assistance of the pump 31 to a separator 35 positioned generally above and proximate to the recovery container 20. Referring now to FIG. 4, the preferred separator 35 is a liquid/-liquid/solid centrifugal separator. The separator has a drum 36 including a cylindrical side wall 37, a top wall member 38, and a frustoconical bottom member 39. The periphery of the bottom member 39 is attached to the bottom edge of the side wall 37 and the center extends into the drum 36. The rotor assembly includes a portion of the stationary inlet manifold 40, a shaft 41, a disc assembly mounted to the shaft 41, and radial spacers 42 secured within the disc assembly. The inlet manifold 40 is fixed to a portion of the housing cover 53, and extends downwardly from the housing cover 53 through the drum top wall memeber 38 and into the rotor disc assembly. The disc assembly is a nested arrangement of spaced apart truncated cone discs 44, including a topmost and bottommost disc 45, 46, respectively. Each disc 44, 45, 46 has a central flat circular portion from which extends downwardly a sloping annular peripheral portion. The sloping portion is the frusto-conical surface of the disc and is shown sloped at a 50° angle from the plane of the flat surface portion. The radial spacers 42 maintain the spaced apart relationship between adjacent discs. As can be understood from FIG. 5, each spacer is a finger plate secured between adjacent discs. Each of the discs 44, not including the topmost and the bottommost discs 45, 46, has a circular arrangement of holes or apertures 47 along its conical surface. The topmost disc 45 has its openings 47 formed in the horizontal upper portion thereof generally in vertical alignment with openings 47 of discs 44. The circular patterns of disc apertures 47 are aligned within the assembly to allow a light liquid to flow upward as the disc assembly rotates. The bottommost disc 46 has attached along the underside of its conical portion a set of three fins 48 extending generally downward from the disc surface into the flow path of the incoming contaminated fluid. The fins 48 are spaced apart at substantially equal intervals along the disc surface. A set of paddles 49 is mounted to a rotor shaft head 50 positioned below the truncated portion of the bottommost disc 46 of the rotor assembly. The rotor shaft head 50 is mounted in the drum 36 for coaxial rotation with the rotor assembly. Each paddle 49 is of rectangular shape and extends upwardly towards the bottommost disc 46 and radially outward from the rotor shaft 41. The paddles 49 are mounted at substantially equal intervals with respect to each other about the rotor shaft head 50.

Referring again to FIG. 4, the drum 36 and the rotor assembly are mounted in a housing 51 having a generally cylindrical body 52, a top cover 53 and a bottom portion 54. The assembly of nested discs 44, 45, 46 is secured to the rotor shaft head 50 by a plurality of shoulder screws 55. The drum and the rotor assembly are concentrically mounted and rotate independently about a vertical axis 56. It can be seen that the drum 36 rotates on bearings 57 mounted in the housing cover 53 and bearings 58 mounted between a drum hub portion 83 and bearing sleeve 84. The rotor assembly is rotatably mounted by bearings 59 mounted between the bearing sleeve 84 and the rotor shaft 41. A motor (not shown) drives the rotor assembly by means of a belt 60 and a pulley 61 mounted on the rotor shaft 41. The directions of rotation for the drum 36 and rotor assembly are generally counterclockwise when viewed from the top.

The contaminated fluid mixture containing liquids of differing density, a light liquid, e.g., a mechanically emulsified oil, a heavier liquid, e.g., a water-based coolant, and solid particles, e.g., metal chips, enters the separator through the inlet manifold 40 which extends to the bottom of the disc assembly. The contaminated fluid drops onto the rotor shaft head 50 where it is thrown or directed outwardly by the rotating set of paddles 49, into contact with the rotating fins 48 extending below the bottommost disc 46 where it is further accelerated towards the drum side wall 37. The drum 36 is then driven by the viscous or shear forces associated with the rotating fluid. In steady state operation, the rotor assembly is driven at about 3600 rpm. The rotation rate of the drum 35 lags behind that of the rotor assembly by 100–300 rpm. As the drum 36 and rotor assembly rotate a wall of fluid is built up along the side wall 37 of the drum 36. Centrifugal forces cause the solid particles in the fluid to be thrown radially outward to accumulate in the portion of the fluid wall closest to the side wall 37 of the drum 36 can be seen in FIG. 5.

As the wall of fluid builds upwardly and flow continues to enter the separator 35, the solids heavier than the fluid separate and move to the drum side wall 37. The lighter liquid separates from the heavier liquid within the disc assembly and flows upwardly along the surfaces of the individual discs 44, 46. As the light liquid collects towards the central portion of each disc, it eventually overflows into the apertures 47 of the discs 44, 46 and proceeds upward towards the upper portion of the disc assembly where it then overflows out of the top disc apertures 47 and is guided upward to the drum top wall member 38 by a downwardly extending annular baffle member 62, best seen in FIG. 5. As the clarified light liquid moves upward along the baffle member 62, it overflows out of the drum through light liquid discharge openings 47' provided in the top wall member 38 of the drum 36. The clarified light liquid then flows along a second baffle-like member 63 extending upward from the drum top wall member 38 where it is guided to an upper collection chamber 64 and then removed through an outlet 65 in its clarified state. The topmost disc 45 of the rotor assembly has a greater diameter than the other discs 44, 46. The lip portion formed by that greater diameter prevents the light liquid flow from proceeding to the heavier liquid discharge openings 66 in the drum top wall 38, by trapping the light liquid flow within the disc assembly.

Figure 5:
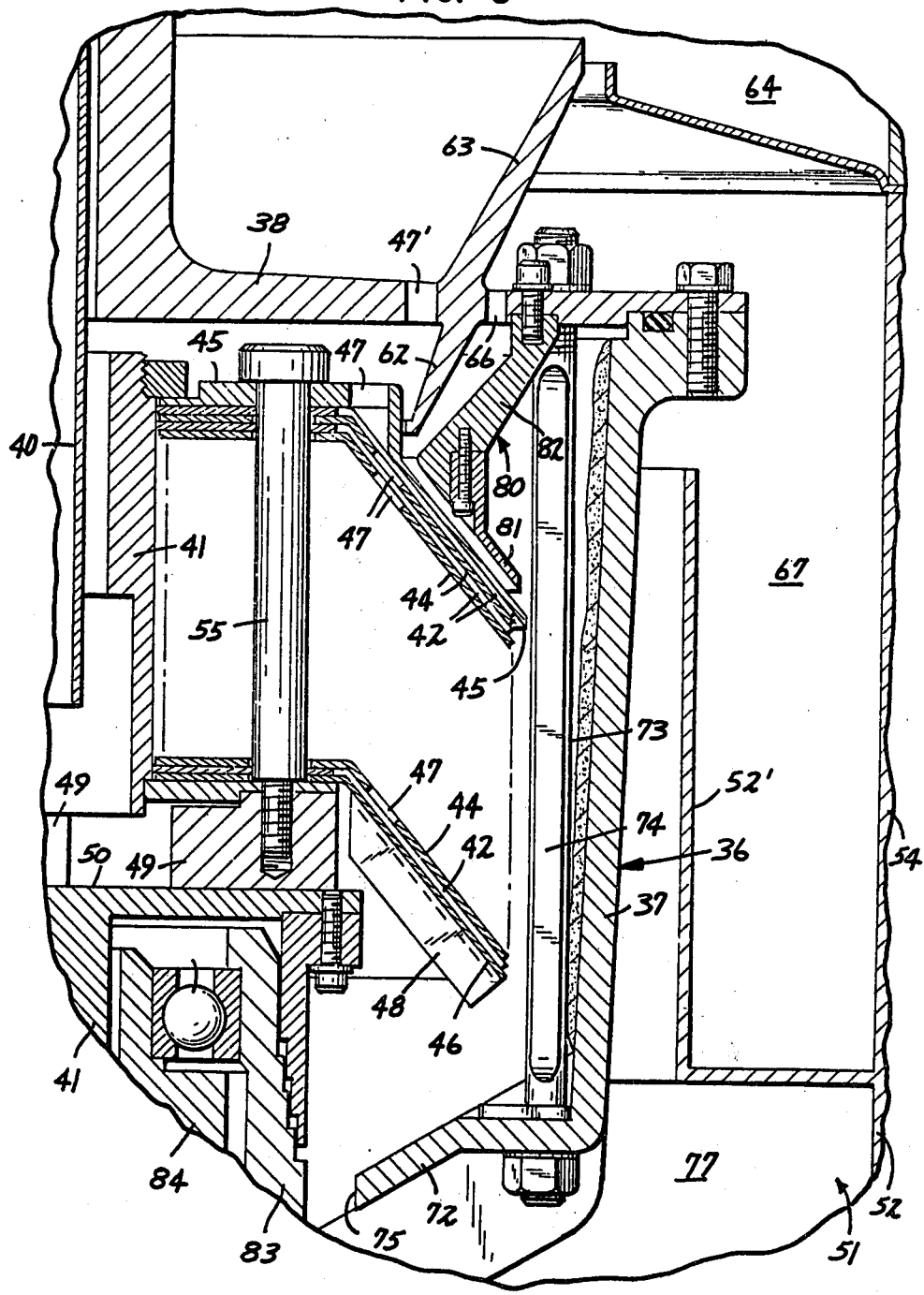
FIG. 5 is a greatly enlarged view of a portion of the separator seen in FIG. 4.

The heavier liquid separated from both the light liquid and the solids flows upwardly near the outer side edges of the disc assembly. When the flow has reached the level of the top disc 45 it flows radially inward between the top disc 45 and a parallel portion 81 of an extension means 80. See FIG. 5. The extension means 80 is a fixed structural member for preventing carryover of contaminated fluid and solids into the disc assembly and liquid discharge openings 47', 66 during the purge cycle. Generally it is an angled, annular member mounted between the drum side wall 37 and the heavier liquid openings 66 in the drum top wall member 38. A portion 81 of the means 80 extends substantially parallel and close to a portion of the conical surface of the topmost disc 45 in the rotor assembly. It is in this gap between the parallel extension portion 81 and the conical surface of the top disc 45 that the clarified heavier liquid flows upwardly and inwardly. As it passes the parallel portion 81 of the extension means 80 it then proceeds generally upwardly in the space between the baffle member 62 and an extension portion 82 where it overflows the drum 36 through the circular arrangement of heavier liquid openings 66 in the drum top wall member 38. As the clarified heavier liquid passes through the openings 66, it enters a lower collection chamber 67 from which it is subsequently released from the separator through an outlet 68. In the preferred embodiment of FIG. 1 the separator outlet 68 is connected to the conduit 34 in order to return the separated heavier coolant fluid to the container 20 through the tangential inlet means 25. The upper collection chamber 64 is defined by the area between housing 51 and the drum top wall member 38. The lower collection chamber 67 is defined by the separator housing body 52 and an internal wall 52' of the housing as shown in FIG. 5. Each chamber is separate from the other.

An air brake 69 shown in FIG. 4 is used to slow and stop the drum 36 when the purge cycle is initiated. When the brake 69 is actuated, a shoe 70 is driven upwards and held against a projection 71 which is in effect an extension of the drum 36.

An annular wall or baffle 72 extends from the bottom of the drum side wall 37. An opposite apex thereof defines an edge or lip opening 75 into which the fluid containing the resuspended particles flows during the purge cycle. The edge opening 75 is formed inwardly of the baffle 72 and beyond the centers of the clarified light liquid openings 47' in the drum top wall 38. Note also in FIG. 4 and 5 that the peripheral edges of the rotor disc assembly extend beyond the outermost edges of the clarified heavier liquid openings 66. Particles, as stated above, accumulate during the separation process on the drum side wall 37 between the drum top wall member 38 and the baffle 72.

A pair of purge rods 73 are bolted to the inside of the drum 36 near the side wall 37 so as to extend from the drum top wall member 38 to the inner edge of the baffle 72. The rods 73 are positioned opposite each other in the drum 36. Each rod 73 has a generally circular cross-section, but a longitudinal flat surfaced portion 74 along the rod length is also provided. Each rod's flat surface faces opposite the directions of rotation of the drum and rotor assembly.

When the drum 36 is stopped or slowed, the rotor assembly continues to rotate. The fluid is disrupted and the accumulated particles are penetrated by fluid flow diverted as a result of impacting the flat surfaces 74 of the purge rods 73. The particles are then resuspended in the fluid. As the purge cycle continues, the fluid and the resuspended particles flow inwardly and downwardly along the upper surface of the baffle 72, downwardly through the lip openings 75 and downwardly through an opening 76 leading from the solids collection chamber 77. The purged fluid and solids then exit the separator through a ramp-like outlet 78, only partially shown in FIG. 4.

With the foregoing description the operation of the fluid recovery system can now be discussed.

The contaminated fluid mixture is initially held in the receiving tank 11 where the relatively heavy solids particulate settle out and are removed by the slow-moving dragout assembly 12 which ultimately discharges the solids particulate in a relatively dry state through the discharge opening 13 into a collection chamber (not shown). Any floating foreign objects are collected along the grid-like screen 15 in the overflow portion 14 of the receiving tank 11 and can subsequently be removed from the tank 11.

As the contaminated fluid mixture overflows the tank 11, it flows into the top portion 23 of the recovery container 20. When the container is partially filled, the pump 31 is turned on thus starting the process of recovering the coolant fluid. The pump draws the fluid mixture out the opening 24 and transfers it to the separator 35 where the separation of mixture is carried on as discussed above in the description of the centrifugal separator 35. Separated tramp or free oil is discharged from the separator 35 through outlet means 65 where it is deposited into an oil concentrator (not shown) for further recovery and concentration or into a collection container (not shown) for disposal. During the purge cycle of the separator, the separated solids particulate exit the separator 35 through outlet means 78 where the material is collected and disposed of. More importantly, however, is the route of the recovered coolant fluid which is released from the separator 35 through outlet 68 into conduit 34. Conduit 34 carries the recovered coolant fluid flow into inlet means 25 where the flow enters the tank 20 in a plane substantially perpendicular to the vertical axis 18 and near the liquid surface level of the container's contents, either just below or just above the fluid surface level.

In combination with the downwardly sloping side walls 21 of the container 20 and the bottom outlet opening 24 through which the container's vertical axis 18 passes, the entering tangential flow of the returning coolant fluid imparts a rotational velocity to the container's fluid contents. This rotational velocity in combination with the natural tendency of draining liquid to swirl creates a fluid vortex and whirlpool in the container. See FIG. 2. The free oil within the contaminated mixture will naturally separate and rise to the top of the rotating fluid's surface. In the prior art, various mechanical skimming devices were used to remove the accumulated oil from the surface of the fluid held in prior art settling tanks. A direct result, however, of the vortex forces created within the container 20 of the present invention is the quick drawing of all of the surface-collected oil down into the whirlpool's central rotating surface, the air core of the vortex, along the vertical axis 18 and out the outlet opening 24 to the preferred air-operated pump for transfer on to the separator 35 for final separation within the separator 35 where the coolant fluid and surface-collected free oil are further separated and removed from each other.

In the second embodiment shown in FIG. 3, a portion of the fluid mixture discharged from the container opening 24 is returned to the container 20 prior to its entry into the separator 35. Most of the fluid mixture discharged through opening 24, however, proceeds directly to the separator 35 for final separation and subsequent discharge through respective separator outlets 65, 67 and 68. A two-way, diverter valve 32 directs a portion of the fluid into the conduit 33 where it is pumped back to the container inlet means 25, where it then enters the container 20 in a tangential direction with a velocity which creates with the centrally located opening 24 the fluid vortex discussed above.

The combination of the fluid vortex-creating container 20 and the centrifugal separator 35 eliminates the need for the prior art oil skimming devices in a system for coolant fluid recovery. Furthermore, the design and construction of the container 20 accomplishes the "skimming" process in substantially less time and more effectively than was possible with the prior art devices.

With the foregoing in mind, a description of the preferred embodiment of the present invention and its operation will now be explained. For purposes of illustration the invention is discussed with respect to its operation as used in the fluid recovery system shown in FIG. 1. However, as stated earlier, the invention, a device for limiting vortex flow, is not strictly limited to use solely in fluid recovery systems of the type herein disclosed.

Based upon actual use of the fluid recovery system just described, it has been determined that the vortex flow created within the container 20 as fluid is simultaneously introduced into and withdrawn from the container can create operating problems when the pump 31 and centrifugal separator 35 described above are used. The skimming effect produced by the vortex flow is desired; however, the air core of the fluid vortex and the oil carried on the surface of the air core exiting the tank 20, enter the pump 31 and separator 35 in quantities disproportionate to that of the heavier contaminated fluid. The air and oil, in the absence of sufficient heavier fluid, combine to create a "butter-like" substance which prevents the operation of the pump 31 and separator 35 at their maximum efficiencies. It is, therefore, necessary to provide a means or device within the container 20 which will not significantly affect the fluid vortex flow but which will transfer into the outlet opening 24 a sufficient amount of heavier contaminated fluid along with the air and surface-carried oil, thus allowing the pump and separator to operate most efficiently. Schematically illustrated in FIG. 11 is the placement of the present invention within the fluid recovery system illustrated in FIG. 1. It is to be understood that, solely for purposes of discussion, the preferred embodiment shown in FIG. 1 has been chosen to illustrate the operation of the vortex flow limiting device. However, the device is also completely compatible for use in the second embodiment shown in FIG. 3.

Referring now to FIGS. 6-10, the structure of the vortex flow limiting device 90, or the "limiter" as it is also called, is disclosed. The limiter 90 is made of any material, i.e., plastic, stainless steel, metal, etc., which will not be subjected to chemical attack as a result of contact with the coolant fluid mixture. Two embodiments of the limiter are shown, 90, 100. The embodiment 90 seen in FIG. 6 is generally considered to be the preferred structure for reasons discussed hereinafter.

The limiter 90 in FIG. 6 has at its lower end a means 91 for securing the device to the outlet opening of the tank. Although other standard securing means would be possible, the preferred method is to use a threaded tubular member 91 having a diameter substantially equal to that of the outlet opening 24. Extending upwardly from opposing sides of the threaded member is a pair of rod-like legs 92. The legs 92 provide the connecting means between the lower and upper ends of the device 90. A fluid passageway 93 is defined by the upper and lower ends and the legs 92. The upper end portion is a generally funnel-shaped member 94 which in the preferred embodiment is shaped similar to a truncated cone. A flange 95 and skirt 96 extend downwardly from the lower periphery of the truncated cone and define a portion of the fluid passageway 93. The legs 92 engage the lower periphery of the skirt portion 96. At the uppermost end of the truncated cone portion 94 is a flat surface 97 having a centrally located opening 98 passing therethrough. See FIG. 12. The member 94 is a vortex flow generating member. It is best used with low rotational fluid flows as the truncated cone portion will help redevelop the interrupted air core for passage upwards into the fluid contained above the limiter. Furthermore, this embodiment will not discourage the re-formation of the otherwise weak vortex air core to the extent the structure of the alternate embodiment might.

Referring now to FIGS. 7-10, an alternate embodiment 100 for the limiter is shown. The securing means 101, the connecting legs 102, and a passageway 103 are constructed substantially as described for similar elements in the preferred embodiment 90. The difference between the two embodiments is in the upper portion of the device 100. The alternate embodiment retains the truncated cone portion 104 and has a flange 105 extending downwardly from its lower periphery to which are secured the legs 102. The difference is in the addition of a neck portion 106 extending upwardly from the top, flat surface of the truncated cone portion. An opening 107 extends completely through the neck 106 and the truncated cone portion 104, as can be seen in FIG. 10. This embodiment is used with relatively high rotational flows where the resulting vortex air core is relatively strong and is not easily interrupted.

The generally funnel-shaped design of the vortex generating member 94, 104 allows the vortex to be controlled and directed along the axis of the tank. This is desirable as the placement of the tangential inlet 25 at one side of the tank 20 prevents a balanced rotation of the fluid about the tank's vertical axis 18. Such an imbalanced rotation creates a drag force which normally causes the resulting vortex air core to "wander" about in the tank 20. With the funnel-shaped design of the limiter member 94, 104, the formation of the vortex air core is controlled and directed along the vertical axis 18, thus eliminating the otherwise natural wandering of the vortex.

With the structure of the limiter disclosed its function and operation can now be understood. As the rotating fluid within the tank 20 develops a certain momentum, the vortex air core competes with the heavier fluid to exit the outlet opening 24. Instead of a continuous feeding of air and surface-carried oil from the tank as illustrated in FIG. 13, a more proportional volume of air, oil and heavier fluid is desired. The vortex flow limiting device achieves this objective.

The device 90, 100 is secured within the tank by screwing its lower tubular member 91, 101 into the outlet opening 24 of the tank 20. See FIG. 11. As fluid is drawn out of the tank 20 and simultaneously fed into the tank, the fluid vortex develops. The creation of the vortex flow begins near the outlet opening 24 and builds upwardly. As can be seen in FIG. 12, the passageway 93, 103 in the device 90, 100 allows a re-mixing of the surface carried oil and the heavier fluid and causes the "disappearance" or interruption of the vortex air core immediately above the tank outlet opening 24. A sufficient re-mixing of the mixture components results and satisfies the operational requirements of the pump 31 and separator 35. The vortex generating member 94, 104 of the device 90, 100 redevelops the vortex air core and helps it extend upwardly into the remaining fluid in the tank. The member directs the air core through the opening 98, 108 and helps maintain the position of the air core along the vertical axis 18 of the tank 20.

It should be understood that when the air core is not completely interrupted in the open space 93, 103 of the device, the vortex generating member 94, 104 assists the air core in penetrating through to the outlet opening 24 of the tank 20 by guiding the air core along the vertical axis 18 to the center of the outlet opening. Continuous air core penetration of the outlet opening is prevented as the rotating fluid gains in momentum, thus a "surging" of the air core back and forth within the open space of the device results as rotational flows vary. Complete interruption or "disappearance" of the air core occurs less frequently as the rotational flow increases. With low rotational flow, the interruption of the air core is, by contrast, frequent, as the fluid rushing into the passageway of the device easily destroys the weak vortex air core.

Obviously modifications and variations of the present invention are possible in light of the above disclosure. Therefore, it is to be understood that within the scope of the following claims the invention may be practiced otherwise than as specifically described herein.

What is claimed is:

1. In a forced vortex environment including a structure for containing fluid, said structure having inlet means, and an outlet opening positioned with respect to said inlet means so as to create a fluid vortex flow in the fluid contained within the structure, said fluid vortex flow having an air core originating at said outlet opening, means for interrupting said air core near said outlet opening and for redeveloping the interrupted air core, said means comprising:
   a vortex generating member having an opening extending therethrough; and
   means for supporting said vortex generating member in spaced apart relation to said outlet opening;
   said supporting means defining a fluid passageway between said vortex generating member and said outlet opening with said passageway being constructed and designed to allow flow therethrough of fluid contained in said structure in a manner interrupting said air core;
   said vortex generating member being shaped and configured to regenerate said interrupted vortex air core and allow said regenerated air core to extend upwardly through said opening in an uninterrupted state.

2. The device according to claim 1 wherein said vortex generating member includes a truncated cone-shaped member having an open first end secured to said supporting means and a second end, said opening extending through said second end.

3. The device according to claim 1 wherein said supporting means includes a tubular member secured in coaxial relation with said outlet opening.

4. The device according to claim 3 wherein said supporting means includes at least one rod-like leg connecting said vortex generating member to said tubular member.

5. In a container constructed and designed to impart a vortex flow to fluid contained therein, the container having a vertical axis and an outlet opening centered on said axis, a device for limiting the vortex flow near the outlet opening, said device comprising:
   means for securing said device to said outlet opening allowing fluid flow therethrough in a manner interrupting the vortex flow of the fluid at said outlet opening;
   a member positioned apart from said securing means, said member having an open first end connected to said securing means, at least one said wall tapering generally inwardly and upwardly from said first end to said second end, said second end including a central portion having an opening extending therethrough, the center of said opening being positioned on said vertical axis, said interrupted vortex flow being redeveloped by said member side wall and said opening; and
   means for positioning said member in a spaced apart, coaxial relationship to said securing means, said positioning means being constructed and designed to allow fluid exterior to said device to flow generally inwardly to said outlet opening, thereby interrupting said vortex flow adjacent said outlet opening.

6. The device according to claim 5 wherein said securing means includes a threaded tubular member.

7. The device according to claim 6 wherein said positioning means includes a rod-like leg, said leg having a first end secured to a portion of said tubular member and a second end secured to a portion of said first end of said member, and a fluid passageway defined by said member, said outlet opening, and said leg.

8. In combination with a container having walls defining a generally centrally located, bottommost outlet opening, a generally circular cross-section, and inlet means for introducing a fluid into said container in a manner creating with said outlet opening a fluid vortex, the fluid vortex having a central portion defining a rotating surface extending through said fluid to said outlet opening, a device for interrupting the rotating surface of a fluid vortex near the container outlet opening, said device comprising:

a vortex generating member having an opening extending therethrough; and means for supporting said vortex generating member in spaced apart relation to said outlet opening, said supporting means defining a fluid passageway between said vortex generating member and said outlet opening for flow therethrough of fluid exterior to said device to interrupt said fluid vortex rotating surface, said vortex generating member being shaped and configured to regenerate said interrupted fluid vortex rotating surface and allow said rotating surface to extend upwardly through said opening in an uninterrupted state.

9. The device according to claim 8 wherein said vortex generating member includes a funnel-like member having an upper neck portion and a lower truncated cone-shaped portion, said neck portion including a central, axial portion having an opening extending therethrough, said lower portion having an opening aligned with said opening of said neck portion.

10. In a system for separating a heavier liquid and a lighter liquid from a fluid mixture:

a container adapted to receive said fluid mixture comprising walls defining a generally centrally located bottommost outlet opening, said container having a generally circular cross-section and inlet means for introducing a fluid into said container in a manner to create with said outlet opening a fluid vortex, said fluid vortex having a central portion with a rotating surface extending through said fluid to said outlet opening;

means for separating said heavier liquid from said lighter liquid;

means for transferring fluid from said container outlet opening to said separating means;

means for recirculating at least a portion of said fluid back to said container through said container inlet means to maintain said fluid vortex, whereby said lighter liquid being carried upon the surface of the fluid is carried by said central rotating surface to said container outlet opening;

the improvement comprising a vortex generating member having an opening extending therethrough;

and means for supporting said generating member within said container in spaced apart relation to said outlet opening, said supporting means defining a passageway between said member and said outlet opening for flow therethrough of fluid to interrupt said rotating surface of said vortex central portion, said vortex generating member being shaped and configured to regenerate said vortex and allow said rotating surface of said vortex central portion to extend upwardly through said opening in an uninterrupted state.

11. The system according to claim 10 wherein said vortex generating member includes an open first end, a second end, at least one side wall tapering generally inwardly and upwardly from said first end to said second end, said second end including a central portion having said opening extending therethrough.

12. The system according to claim 11 wherein said supporting means includes a tubular member secured in coaxial relationship to said outlet opening.

13. The system according to claim 12 wherein said supporting means further includes at least one rod-like leg secured to said vortex generating member first end, said leg positioning said vortex generating member in spaced apart relation to said tubular member, whereby said supporting means defines a fluid passageway between said vortex generating member and said outlet opening.

* * * * *